J. F. J. ARCHIBALD.
MIRROR ATTACHMENT FOR DIRIGIBLE AUTOMOBILE SPOT LIGHTS.
APPLICATION FILED JUNE 7, 1916.
1,206,973.
Patented Dec. 5, 1916.
2 SHEETS—SHEET 1.
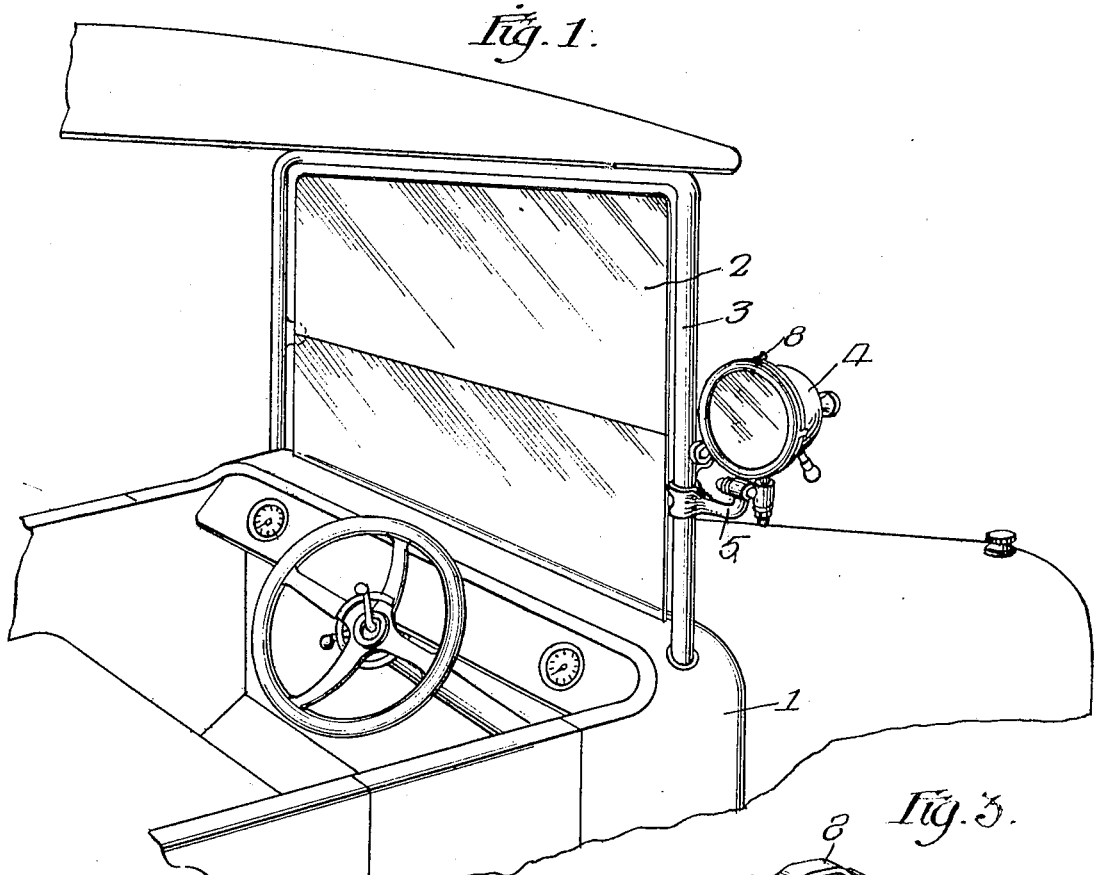
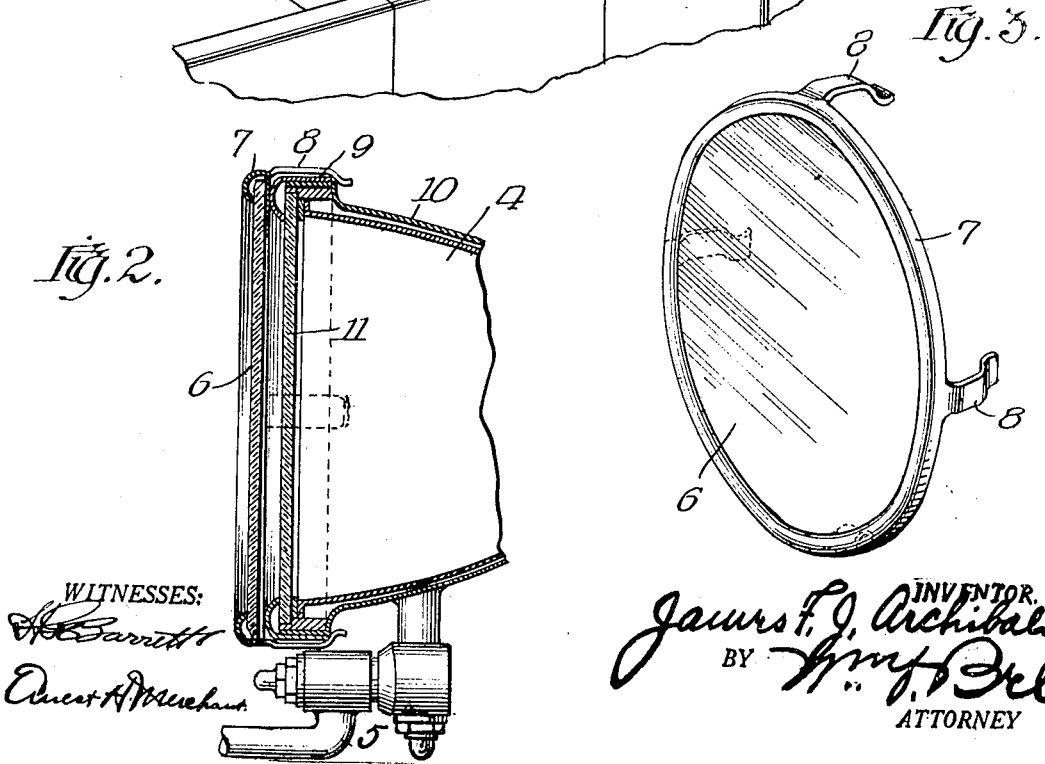

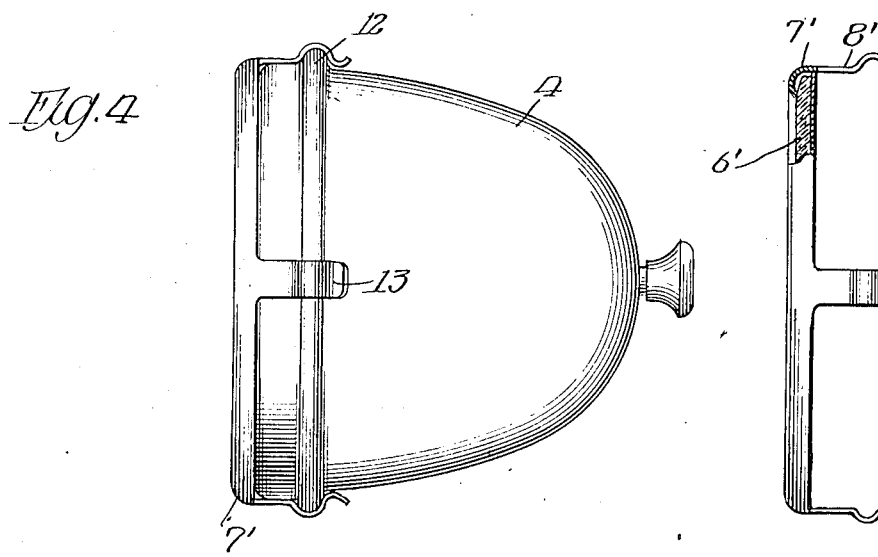
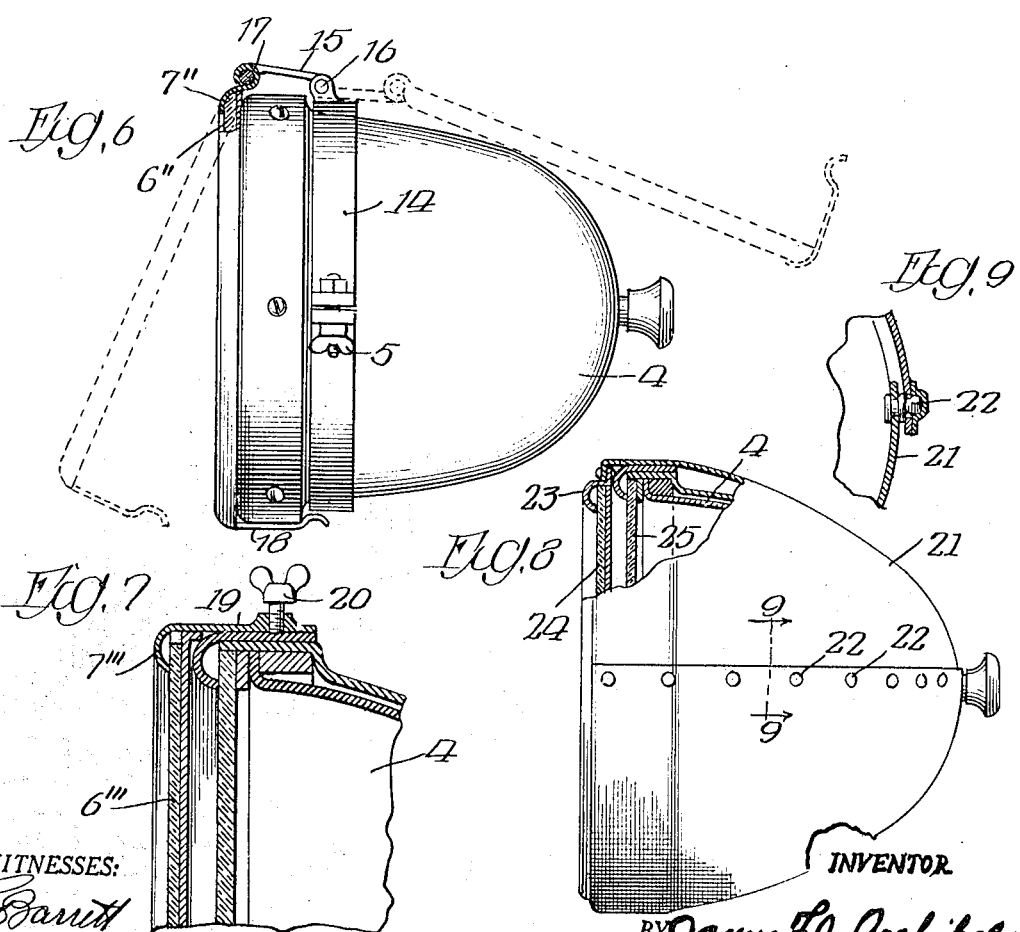

UNITED STATES PATENT OFFICE.

JAMES F. J. ARCHIBALD, OF NEW YORK, N. Y.

MIRROR ATTACHMENT FOR DIRIGIBLE AUTOMOBILE SPOT-LIGHTS.

1,206,973.  Specification of Letters Patent.  Patented Dec. 5, 1916.

Application filed June 7, 1916. Serial No. 102,172.

*To all whom it may concern:*

Be it known that I, JAMES F. J. ARCHIBALD, a citizen of the United States, residing at New York, in the county of New York and State of New York, have invented certain new and useful Improvements in Mirror Attachments for Dirigible Automobile Spot-Lights, of which the following is a specification.

This invention relates to a mirror attachment for dirigible automobile spot lights and has for its object the provision of a mirror which may be attached to the casing of the spot light in front of the glass and readily detached when not required.

Automobiles are now commonly equipped with automobile spot lights attached to the wind shield frame in position to be readily applicable by the person controlling the automobile. Mirrors are also frequently attached to the wind shield frame so that objects behind the automobile may be observed.

My invention provides means whereby the mirror may be supported in readily detachable relation to the casing of the spot light which, of course, is used only at night when the mirror would be useless. I am thus enabled to eliminate the extra supporting structure necessary where the spot light and mirror are carried on the wind shield frame as separate devices.

My invention will be better understood by reference to the following specification when read in connection with the accompanying drawing illustrating the preferred embodiment thereof in which—

Figure 1 is a view in perspective of a portion of an automobile equipped with my invention; Fig. 2 is a vertical longitudinal section through a portion of a spot light with my invention applied thereto; Fig. 3 is a view in perspective of the mirror attachment illustrated in Fig. 2; Fig. 4 is a side elevation of a spot light equipped with a mirror secured thereto in a slightly different manner; Fig. 5 is a side elevation partially in section of the mirror illustrated in Fig. 4; Fig. 6 is a side elevation, partially in section, of a spot light equipped with a mirror secured in another manner thereto; Fig. 7 is a vertical section through a portion of a spot light and mirror illustrating still another fastening means; Fig. 8 is a side elevation, partially in section, of a spot light equipped with a mirror secured thereto by means of a projecting cover which envelops the spot light and Fig. 9 is an enlarged section on the line 9—9 of Fig. 8.

Referring to the drawing, 1 indicates the body of an automobile provided with the wind shield 2 having a frame 3, and 4 indicates a spot light supported on the frame 3 by means of a universal bracket 5, whereby the spot light 4 may be directed as desired and may be turned to the position indicated in Fig. 1.

My invention comprises a mirror 6, supported in a suitable frame 7, which may be provided with spring clips 8, preferably formed integrally with the frame 7 and adapted to slip over the enlarged portion 9 of the casing 10 forming the spot light 4 to secure the mirror 6 in readily detachable relation to the casing with the mirror positioned in front of the glass 11.

In Fig. 4 of the drawing I have illustrated a spot light 4 provided with a bead 12 formed in its casing near the forward end thereof. As illustrated in Fig. 5 the mirror 6' is provided with the frame 7' having spring clips 8' formed at 13 to engage the bead 12 to secure the mirror in readily detachable relation to the casing of the spot light, the mirror being positioned in front of the glass.

In Fig. 6 of the drawing I have illustrated a spot light 4, similar in structure to that illustrated in Fig. 2. A band 14 is disposed about the casing of the spot light 4 and is secured in position by a wing nut 15 so that the band may be readily removed when desired. A link 15 is pivotally mounted on the band 14 at 16 and the frame 7" of the mirror 6" is pivotally mounted at 17 to the link 15. The frame 7" is provided with a spring clip 18, whereby the mirror is held in proper relation to the casing of the spot light 4. By the arrangement just described the mirror may be swung as indicated in the dotted lines to inoperative position or may be entirely removed from the spot light 4 at will by loosening the wing nut 15.

In Fig. 7 of the drawing I have illustrated a spot light 4 similar to those illustrated in Figs. 2 and 6. The frame 7''' of the mirror 6''' is provided with arms 19 extending rearwardly and wing nuts 20 are threadedly disposed therein and adapted to engage the casing of the spot light 4 and secure the mirror in readily detachable relation thereto.

In Fig. 8 I have illustrated a spot light 4 surrounded by a cover 21 which may be made of any suitable material and which is designed to protect the spot light when not in use. The cover 21 may be fastened by suitable snap fastening means 22 as illustrated in Fig. 9, lacing or otherwise. Connected to the cover 21 at the forward end thereof is a frame 23 in which is disposed a mirror 24 and as will be readily understood when the cover 21 is positioned as indicated in Fig. 8 the mirror 24 will be secured in readily detachable relation to the casing of the spot light, the mirror being positioned in front of the glass 25.

From the foregoing it will be readily appreciated that I have perfected a simple and effective means whereby a single bracket may be utilized to support both a spot light and a mirror and that the mirror when not in use may be readily detached and stored where it will be free from possibility of breakage or theft.

It will be obvious that various changes may be made in the form, construction and arrangement of the parts without departing from the spirit and scope of the invention or sacrificing any of its material advantages, the form hereinbefore described being merely a preferred embodiment thereof.

I claim:

A mirror attachment for dirigible automobile spot lights comprising in combination a mirror, a frame therefor, and means connected to said frame to secure said mirror in readily detachable relation to the casing of the spot light with said mirror positioned in front of the glass of said spot light.

JAMES F. J. ARCHIBALD.

Witnesses:
G. A. WOODMAN,
WM. O. BELT.